(12) United States Patent
Doyle et al.

(10) Patent No.: US 7,133,520 B1
(45) Date of Patent: Nov. 7, 2006

(54) DYNAMIC SKILL-BASED CALL ROUTING

(75) Inventors: Robert Doyle, Newbury Park, CA (US); Laird C. Williams, St. Charles, IL (US); Kenneth W. Fertig, Palo Alto, CA (US); Xuemei Wang, Mountain View, CA (US); N. Serdar Uckun, Palo Alto, CA (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 1147 days.

(21) Appl. No.: 09/300,676

(22) Filed: Apr. 27, 1999

(51) Int. Cl.
*H04M 5/06* (2006.01)

(52) U.S. Cl. .................. 379/265.01; 379/265.11; 379/265.12

(58) Field of Classification Search ............ 379/266, 379/265, 309, 265.01–265.14, 266.01–266.1
See application file for complete search history.

(56) References Cited

U.S. PATENT DOCUMENTS

| | | | |
|---|---|---|---|
| 5,206,903 A | 4/1993 | Kohler et al. ............... 379/309 |
| 5,309,513 A | 5/1994 | Rose ........................... 379/265 |
| 5,335,269 A | 8/1994 | Steinlicht .................... 379/266 |
| 5,721,770 A * | 2/1998 | Kohler ........................ 379/266 |
| 5,740,238 A * | 4/1998 | Flockhart et al. ........... 379/266 |
| 5,825,869 A * | 10/1998 | Brooks et al. ............. 379/265 |
| 5,828,747 A * | 10/1998 | Fisher et al. ................ 379/309 |
| 5,864,617 A | 1/1999 | Donnelly |
| 5,903,641 A * | 5/1999 | Tonisson ..................... 379/266 |
| 5,905,793 A * | 5/1999 | Flockhart et al. ........... 379/266 |
| 5,982,873 A * | 11/1999 | Flockhart et al. ........... 379/266 |
| 6,359,982 B1 * | 3/2002 | Foster et al. ........... 379/266.06 |
| 2002/0006192 A1 * | 1/2002 | Bengtson et al. |

FOREIGN PATENT DOCUMENTS

| | | |
|---|---|---|
| EP | 0 740 450 A2 | 10/1996 |
| EP | 1 056 264 A3 | 1/2004 |
| GB | 2 345 819 A | 7/2000 |

* cited by examiner

*Primary Examiner*—William J. Deane, Jr.
(74) *Attorney, Agent, or Firm*—Welsh & Katz, Ltd.

(57) ABSTRACT

A method and apparatus are provided for assigning agents of an automatic call distributor to incoming calls of a plurality of call types handled by the automatic call distributor. The method includes the steps of determining a target occupancy matrix including a target occupancy for each agent of the agents of the automatic call distributor for each call type of the plurality of call types. The method further includes the steps of processing a call of a first type of the types determined in the target occupancy matrix and assigning the call to an agent of the agents of the automatic call distributor with a largest relative difference between an actual occupancy of calls of the first type handled by the agent and the target occupancy of calls of the first type determined for the agent in the target occupancy matrix.

38 Claims, 3 Drawing Sheets

DYNAMIC SKILL-BASED CALL ROUTING

FIELD OF THE INVENTION

The field of the invention relates to telephony systems and more particularly to automatic call distributors used with private networks.

BACKGROUND OF THE INVENTION

Automatic call distribution systems are known. Such systems are typically used in an organizational context as a means of distributing telephone calls among a group of agents of the organization. Agents are typically segregated into groups to serve particular call targets within an organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

In other systems, where skill is considered essential for call handling, a call may be directed to an agent (or agent group) considered the most skilled for the call considered. In these systems, a database of customer records is maintained. Customers are identified to the ACD and database by features such as automatic number identifier (ANI).

In order to staff an ACD, an organization often relies on historical levels (in Erlangs) of incoming calls to the individual call targets. A manager of the ACD may examine the historical call loading records, add or subtract a percentage of the historical loading based upon a most recent call history (e.g., the most recent week or month), and estimate a staffing level based upon those calculations. Alternatively, some organizations have relied upon commercially available predictive software (i.e., force management packages) which calculates daily staffing levels based upon historic information.

Once daily staffing levels have been estimated, agents are scheduled based upon those estimates. Where more than one organizational call target is involved (e.g., sales agents, service agents, outgoing call campaign agents, etc.), requiring different agent skills, each group is separately staffed based upon an Erlang estimate for that group.

As an alternative to staffing individual groups, some systems group all agents together and assign a skill rating to each agent. Calls are then assigned based upon the skill rating of the agent for handling that type of call.

For example, where a single group is used, an ACD will always look for and assign the call to the most qualified agent. However, some agents are more qualified than others. Because of the differences in qualifications, some agents receive more calls than others, resulting in an inequitable work load.

Further, where all agents are grouped together, an Erlang rate for any one group becomes irrelevant. For example, one benefit of using a common group relates to economies of scale. Two separate groups that separately require 10 agents each would typically only require 18 agents from a common pool of agents.

Further, it is difficult, if not impossible for call center management to known how many agents are serving a particular call target. Because of the difficulty of determining agent loading, it is also difficult to project staffing requirements in a shared agent environment.

Where all agents are grouped together, staffing estimates must be based upon an Erlang rate of the organization as a whole. Basing a staffing estimate upon an organization as a whole is subject to large errors. Because of the importance of call handling through ACDs, a need exists for a method of assigning agents which is more flexible than the individual group method, but which may still be staffed based upon Erlang estimates of the individual call groups.

SUMMARY

A method and apparatus are provided for assigning agents of an automatic call distributor to incoming calls of a plurality of call types handled by the automatic call distributor. The method includes the steps of determining a target occupancy matrix including a target occupancy for each agent of the agents of the automatic call distributor for each call type of the plurality of call types. The method further includes the steps of processing a call of a first type of the types determined in the target occupancy matrix and assigning the call to an agent of the agents of the automatic call distributor with a largest relative difference between an actual occupancy of calls of the first type handled by the agent and the target occupancy of calls of the first type determined for the agent in the target occupancy matrix.

BRIEF DESCRIPTION OF THE DRAWINGS

Appendix I is an unpublished paper entitled "AUTOMATIC GENERATION OF AGENT OCCUPANCY MATRIX: REQUIREMENTS AND ALGORITHM DESCRIPTION" that describes (in pseudo-code and otherwise) an algorithm that may be used by the system of FIG. 1.

DETAILED DESCRIPTION OF A PREFERRED EMBODIMENT

Figure 1:
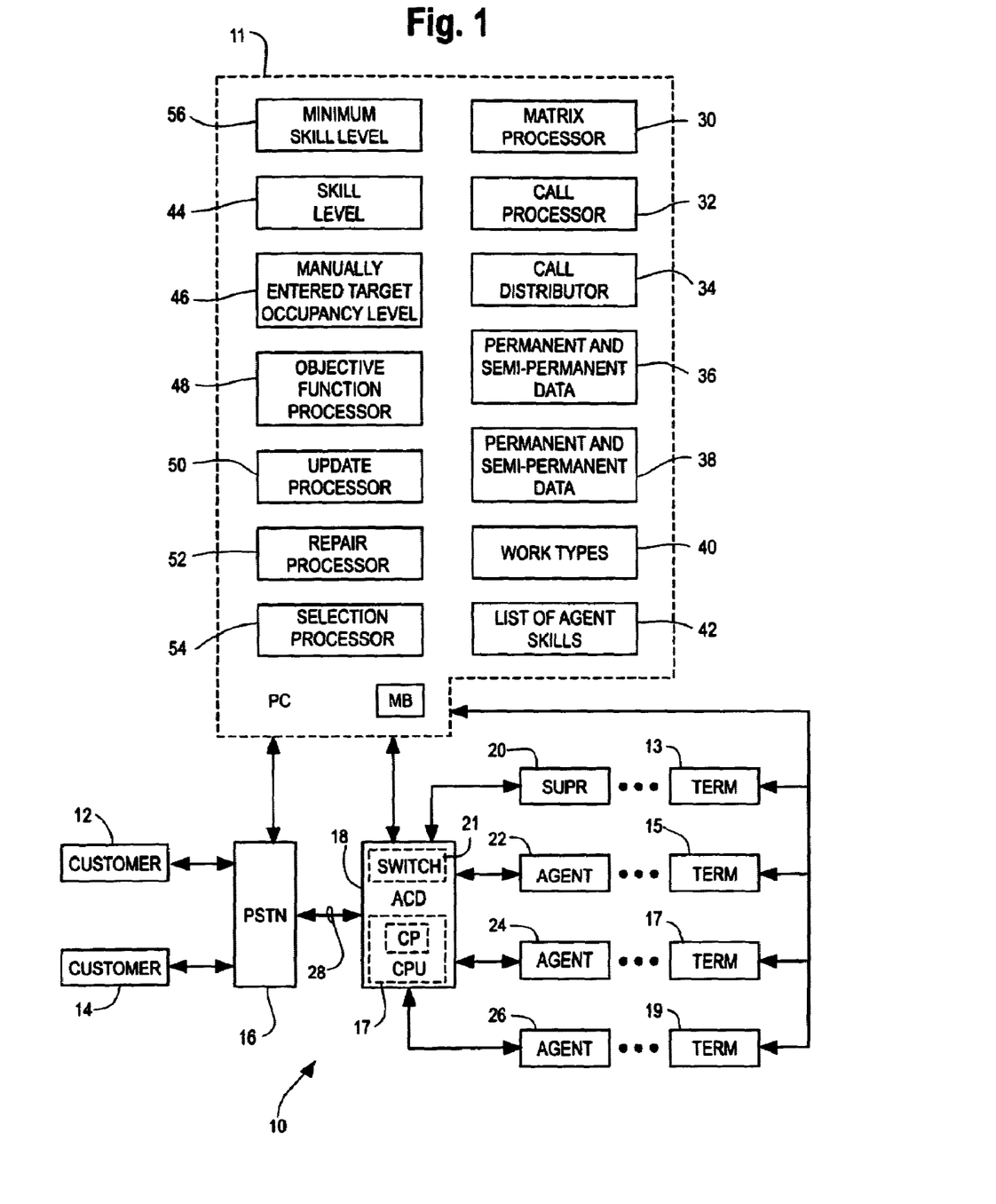
FIG. 1 is a block diagram of an ACD system in accordance with an illustrated embodiment of the invention.

FIG. 1 is a block diagram of an ACD system 10, generally, using skill based call routing under an illustrated embodiment of the invention. Under the embodiment, the ACD 18 may receive calls over a number of trunk lines 28 through the PSTN 16 from customers 12, 14 of the ACD 18. Along with the calls, a call processor (CP) of the ACD 18 may receive information about the calls from the PSTN 18. For example, the ACD 18 may receive an identifier of a caller from an automatic number identification (ANI) service operating from within the PSTN 16. The ACD 18 may also receive information about a dialed number through a dialed number identification (DNIS) service or direct inward dial (DID) information from the PSTN 16.

The ACD 18 may also be programmed to place calls at the same time as it receives calls. For example, the ACD 18 may conduct an outgoing call campaign to existing or potential customers at the same time as it receives calls from existing or potential customers.

In the case of outgoing calls, a list of telephone numbers (i.e., call targets) may be entered through the PC 11 and sequentially transferred to the ACD 18. Upon receipt of a call target, the ACD 18 may seize a trunk line of the trunks 28 and transfer the target telephone number to the PSTN 16. When the target answers, the ACD 18 connects the target to an agent.

In the case of an outgoing call, the PC 11 may transfer an identifier of the call target to the ACD 18. Alternatively, the ACD 18 (e.g., by reference to a database) may determine an identity of the call target based upon the dialed number.

From the information received from the PSTN 16 (or PC 11), the ACD 18 may classify the call as a particular work type based upon the identity of the call target and whether it is an inbound or outbound call. For example, the ACD 10 may be owned and operated by a department store. Individual call targets may include women's clothing, men's clothing, footwear, housewares, appliances, electronics, furniture, hardware, automotive and garden. Other internal call targets may include catalog sales or technical support for one or more of the other call targets.

As opposed to creating semi-permanent groups of agents and queuing calls to the appropriate group, the ACD 18 places agents in a single pool and directs all calls to this pool. Agents are rated according to skill level in each call type. A target agent responsibility (occupancy) matrix is created to allocate portions of agents' time to each call type, based on the agent skill in handling that call type, as well as call type workload and other enterprise-related factors. Table I is a simplified example of a target occupancy matrix.

TABLE I

| | Tocc (j) | WORK TYPE #1 | WORK TYPE #2 | WORK TYPE #3 |
|---|---|---|---|---|
| AGENT #1 | 85% | 10% | 60% | 15% |
| AGENT #2 | 50% | 20% | 20% | 10% |
| AGENT #3 | 90% | 30% | 30% | 30% |
| AGENT #4 | 90% | 70% | 10% | 10% |

Figure 2:
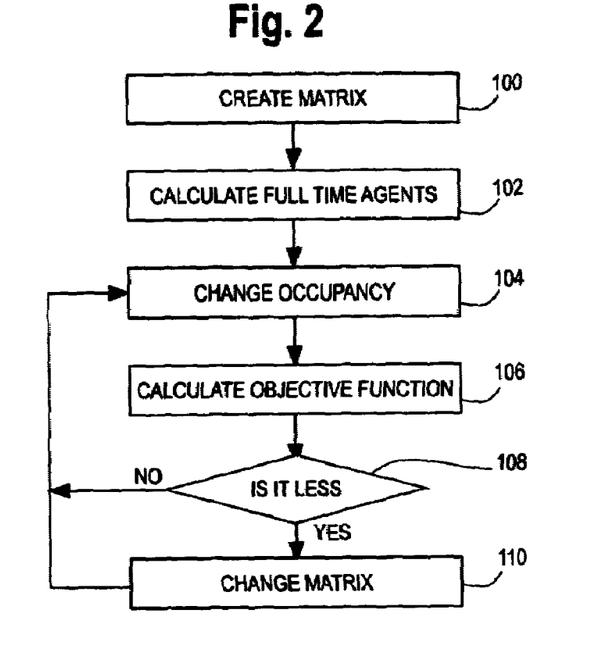
FIG. 2 is a flow chart of process steps that may be used by the system of FIG. 1.
Figure 3:
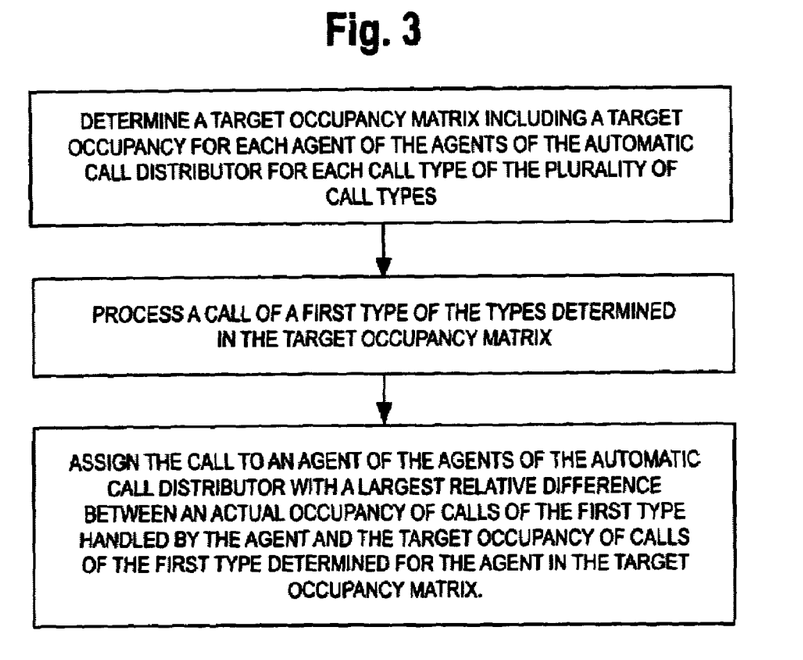
FIG. 3 is a flow chart of method steps for call assignment that may be used by the system of FIG. 1.

FIG. 2 is a flow chart that may be followed in creating the target occupancy matrix within a matrix processor 30. Reference will be made to FIG. 2 as appropriate to an understanding of the invention.

In the over-staffed situation (agents available when a call arrives), the call is handled by the agent whose actual occupancy is furthest from the target occupancy for that call type. Actual occupancy may be defined as the amount of time an agent has spent on a particular work type divided by a time of a reporting period (e.g., a workshift) and expressed as a percentage. Table II is an example of an actual occupancy matrix.

TABLE II

| | Tocc (j) | WORK TYPE #1 | WORK TYPE #2 | WORK TYPE #3 |
|---|---|---|---|---|
| AGENT #1 | 85% | 10% | 50% | 15% |
| AGENT #2 | 50% | 19% | 20% | 10% |
| AGENT #3 | 90% | 27% | 30% | 25% |
| AGENT #4 | 90% | 50% | 10% | 10% |

Where a call comes in (e.g., for work type #1) a comparison is made by a call distributor 34 of the deviation of each agent from the target occupancy for that work type. As may be seen by comparing Tables I and II, agent #4 has a target occupancy for work type #1 of 70% and an actual occupancy for work type #1 of 50%. Since agent #4 has the greatest deviation, the next call of work type #1 would go to agent #4.

In the understaffed situation (no agents available and calls are queued), a call will be selected from the queue of a work type which will bring an available agent's actual occupancy level closest to the target for that agent. If there is more than one call of that work type, then the call with the highest priority or the longest time in queue may be chosen.

The system may be used to provide real-time reporting in the form of a display of actual versus target agent occupancy for each call type, and provides a mechanism for adjusting the targets. This solution has the advantage that it gives call center management, working through the PC 11 (hereinafter referred to as the "user"), a mechanism for easy control over agent assignments in the form of target occupancies, and it provides uniform agent utilization where desired.

Under the illustrated embodiment, each agent is evaluated and assigned a skill level for his proficiency in any number of skills related to servicing calls directed to each particular type of call target. An agent may be assigned a skill level expressed as any number between 1.0 and 2.0 (i.e., where 2.0 indicates the highest level of proficiency), in increments of 0.1. Table III is an example of a skills matrix that may be used to classify agents.

TABLE III

| | ENGLISH | SPANISH | WOMENS CLOTHING | MENS CLOTHING | FOOTWEAR |
|---|---|---|---|---|---|
| AGENT #1 | 1.1 | 0.0 | 1.5 | 1.9 | 1.3 |
| AGENT #2 | 1.9 | 1.3 | 1.5 | 1.1. | 1.8 |
| AGENT #3 | 1.5 | 1.5 | 1.7 | 1.2 | 0.0 |

Agent proficiency may be regarded as one example of semi-permanent data that may be used by the PC 11 in creating a target occupancy matrix. Permanent and variable data may also be used.

Permanent data may include a list of skill types 42 required for each work type. A list may also be provided of the work types handled by the system 10. A minimum skill level 56 may be included for each skill required for each work type. A priority number may be provided for each work type.

Variable data may include a target total agent occupancy (Tocc(i)) for each agent i. For example, an agent may have a target total agent occupancy of 85, 95 or even 100%. Further, the variable data may include one or more target agent occupancies for the particular work types.

Variable data may also include an expected call load for each work type. The expected load may be in Erlangs. The variable data may also include a list of agents scheduled to work during any time period.

Once the permanent, semi-permanent and variable data 36, 38 have been provided to the PC 11, the PC 11 may form an initial target occupancy matrix. In forming an initial target matrix, the PC 11 must determine whether an agent is qualified to be given an occupancy value for any particular work type within the target matrix.

To determine the suitability of an agent for a work type, the PC 11 evaluates each agent's qualifications with regard to the work type. Each agent i must possess a skill level 44 which exceeds a minimum level required by the work type. In effect, the skill ASkl(i,k) of agent i for skill k must exceed the skill requirement WSkl(j,k) for work type j in skill k. Further, any particular work type 40 may require a skill set including more than one evaluated skill. Stated differently, for an agent to be assigned to a work type, ASkl(i,k)μWSkl (j,k) for all k.

In the example of Table II, a call from/to a particular geographic area may be known to include a large Spanish population. Calls regarding a telephone number associated with this area regarding footwear would require at least two skills (i.e., the ability to speak Spanish as well as a knowledge of footwear). A minimum skills level may be required in each skill.

To evaluate an agent for a work type where multiple skills are required, the PC 11 solves for the euclidean distance Acap(i,j) between the agent i's skills and work type j's requirements. Expressed differently, the PC 11 solves the equation as follows:

$$ACap(i, j) = \sqrt{\sum_k (ASkl(i, j) - WSkl(j, k))^2}, (WSkl(j, k) > 0).$$

If for any k, such that ASkl(i,k)<WSkl(j,k) (i.e., agent i does not satisfy the minimum skill requirements of work type j), then $$ACap(i, j) = -\sqrt{\Sigma(ASkl(i, j) - WSkl(j, k))^2}, (WSkl(j, k) > ASkl(i, k)).$$

Expressed differently, where ACap(i,j)≧0, the agent may be regarded as qualified for the work type. Where Acap(i,j)<0, the agent may not be regarded as qualified for the work type.

Figure 4:
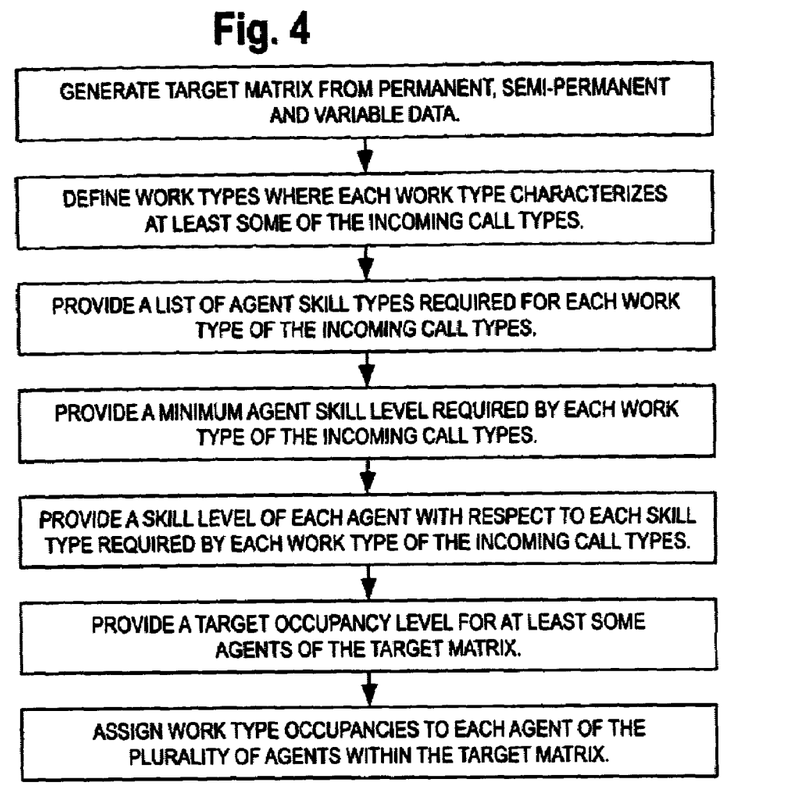
FIG. 4 is a flow chart of method steps that may be used for generating a target occupancy matrix by the system of FIG. 1.

Once the capability of each agent is determined, the PC 11 may form 100 an initial target matrix. To populate the matrix, the PC 11 may first retrieve a set of occupancy values entered by the user. For example, the user may enter a total occupancy Tocc(i) for a particular agent i over all work types. The user may also enter an occupancy value ("X(i,j)") 46 for the agent i regarding one or more work types j. Ultimately, the user could specify the entire scope of the initial target matrix, but this is not necessary since the PC 11 will supply occupancy values where necessary.

Further, as will be discussed below, the user may designate some agents as primary agents for a work type. Other agents may be designated, or may become, secondary agents.

Where an agent is to be designated as a primary agent of a work type, that agent would be expected to have a higher occupancy rating for the work type, than secondary agents. The user may explicitly specify the occupancy rating for a work type or allow the PC 11 to specify the occupancy rating by merely designating primary agents for some work types. While any value may be used, an occupancy rating X(i,j) of 70% may be used by the PC 11 as a default value when that agent is designated as a primary agent by the user.

Upon retrieving the occupancy values entered by the user, the PC 11 first verifies that the sum of the occupancy ratings X(i,j) assigned to an agent among the work types is less than, or equal to, the Tocc(i) for that agent. The PC 11 may then take steps to fully populate the initial target matrix.

The PC 11 may first determine 102 the number of effective agents available by summing the Tocc(i) values for the agents schedules to work for any particular time period. For example, if two agents were available and each had a Tocc(i)=50%, then the number of effective agents in this case would be one. The number of effective agents for the system 10 may be determined by solving the equation as follows:

$$effectiveAgents = \sum_{i=1}^{numOfAgents} Tocc(i).$$

A residual staffing level ("residualStaffing") may be determined by subtracting the sum of the predicted workload of each work type ("Prdtworkload(j)") from the number of effective agents as follows:

$$residualStaffing = effectiveAgents - \sum_{j=1}^{numOfWorkTypes} Prdtworkload(j).$$

If there are more effective agents than the sum of predicted workloads, then extra agents are distributed among the work types based upon loads and staffing priorities. If there are fewer effective agents than the sum of predicted workloads, then each work type is assigned fewer agents than is suggested by its workload. The number fewer is dependent upon the work loads and priorities ("relativePriority"). In either case, a target number of effective agents for each work type ("TargetFTE(j)") is determined as follows:

$$perPortion = \frac{residualStaffing}{\sum_{j=1}^{numOfWorkTypes} (relativePriority(j))(prdtworkload(j)},\ and$$

$$TargetFTE(j) =$$
$$(perPortion)(relativePriority(j))(prdtworkload(j)) + prdtworkload(j).$$

To populate the initial target matrix, a selection processor 54 within the PC 11 sequentially selects agents and randomly selects work types. The occupancy X(i,j) given agent i to work type j may also be random or may be a percent of total time or a fixed value, so long as the sum of all occupancies for the agent is less than a user specified Tocc(i) or 100%.

Tocc(i) may be set by the user at anywhere from zero to 100%. If not specified by the user, the Tocc(i) for an agent will have a default value of 100%. If Tocc(i) is set by the user, the PC 11 will not change it. Similarly, if the user selects a work type occupancy X(i,j) for an agent, the PC 11 will not change it.

It should be kept in mind that while the PC 11 randomly selects work types, any selected work type will be skipped if an agent is not skilled for that work type (i.e., ACap(i,j) <0). The PC 11 may then randomly select another work type. The PC 11 may also check that the occupancy does not exceed a maximum number of work types allowed per agent ("MaxNumWtPerAgent"). If it does, the PC 11 goes on to the next agent.

For instance, where a Tocc(i) for an agent is manually selected by the user at 80% and there are four work types, then the PC 11 may ultimately assign an occupancy of 20% to each work type. If based upon the agent capability Acap(i,j), the agent is not qualified for the first work type, then the PC 11 may assign work type occupancy values of 30% to the second and third work type and 20% to the last work type.

In general, the PC 11 will repetitively assign work types X(i,j) until each agents' Tocc(i) is reached. Preferably, the PC 11 uses small values (i.e., fractional occupancies) of X(i,j) to maximize the number of work types ("numOfAssignedWts(i)").

To ensure that each agent gains experience in other work types, a minimum number of work types ("MinNumWTPerAgent") may also be specified. Where the threshold value for a minimum number of work per agent ("MinNumWTPerAgent") is not met, the PC 11 may divide up one or more of the agent's occupancies among other work types to achieve the threshold value.

Once an initial target matrix is achieved, the PC 11 may compute a number of assigned equivalent full time agents for each work type ("assignedFTE($j_O$)". The PC 11 also calculates an average agent capability ("aveCap($j_O$)") by averaging the ACap(i,$j_O$) of the agents given an occupancy for work type $j_O$.

Once the initial target occupancy matrix is achieved, the PC 11 may begin to iteratively repair the matrix. Iterative repair may be performed continuously to accommodate changes in call loading or periodically based upon some objective loading standard (e.g., queue length for call groups). Where iterative repair is performed periodically, the iterative process may begin and continue for a fixed number of iteration cycles specified by the user.

Figure 5:
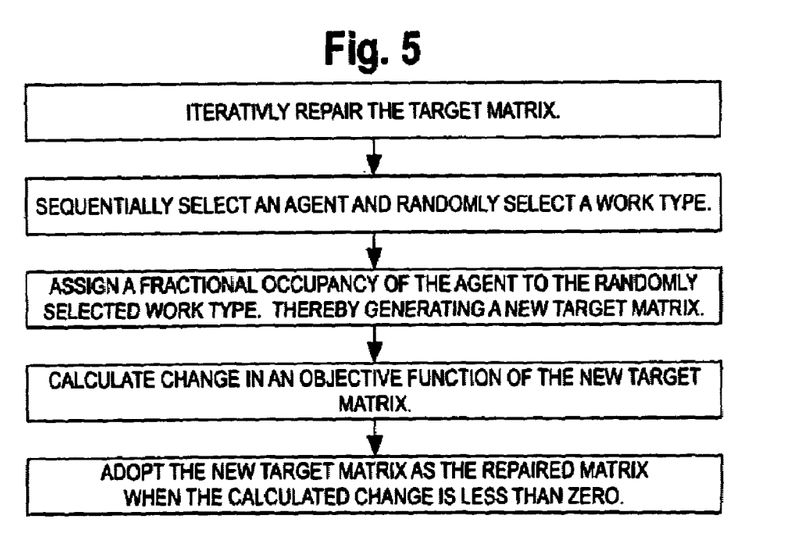
FIG. 5 is a flow chart of method steps that may be used for target occupancy repair by the system of FIG. 1.

As a first step in the interative repair process, an objective function processor 48 and repair processor 52 within the PC 11 may compute an objective function value ("computeObjectiveFunctionValue( )"). The objective function value provides a means of evaluating a new (iterative) target matrix over a previous target matrix. The value of the objective function may be determined as follows:

Value=(weightFTE)(scoreFTE)+(weightSkills)(scoreSkills), where "weightFTE" is a number indicating how important it is to allocate the right amount of staffing to each work type to match a predicted workload (a default value of weightFTE may be set equal to 1), where "weightSkills" is a number indicating how important it is to maximize the average of aveCap(j) per work type (weighted by the agents' occupancy for that work type) (a default value of weightSkills may be set equal to 10), where $$scoreFTE = \sum_{j=1}^{numOfWorkTypes} (targetFTE(j) - assignedFTE(j))^2 \text{ and}$$

$$scoreSkills = \sum_{j=1}^{numOfWordTypes} (aveCap(j) - bestCap(j))^2,$$

where "bestCap(j)" is the highest relative ACap(i,j) score for the work type j.

Once the objective function value is determined, agents are again selected sequentially one-by-one. For each selected agent, a first work type is selected randomly from a list of work types in which the agent already has an occupancy. A second work type is then selected at random and a portion of the agent's occupancy is transferred 104 from the first work type to the second work type.

A revised target matrix is then created using the transferred occupancy. A new objective function value is determined 106 from the revised target matrix. If an update processor 50 detects that the new objective function is smaller 108 than the previous objective function, then the change 110 in occupancy is made to the target matrix. If not, then the next agent is selected and the process is repeated.

In addition, before the change in occupancy is executed, the PC 11 performs the checks discussed above. For example, is the agent qualified to perform the work of the second work type?

In an alternative embodiment, the iterative repair may include selection of an overstaffed work type for which the agent has a non-zero occupancy value and selection of a second work type for which the agent is qualified. If the objective function is smaller, the change is implemented. Otherwise, the next agent is selected and the process is repeated.

The number of agents required for each work type (i.e., targetFTE(j)) for each work type j may be estimated from historical workload and Erlang tables, or from force management packages. For example, a prior history of call loading for a particular work type may be retrieved from an archive. The loading may be increased by some factor based upon most recent history to achieve an initial estimation of the number of agents required for each call type.

Iterative repair may be made periodically or only when required by call loading for a group. Specifically, an increase in a call arrival rate of a particular call type over the initial (or later) loading estimate may be used to trigger iterative repair.

The need for iterative repair may be determined by a number of methods. For example, the length of time a caller spends in a call queue is one measure of call loading. However, since callers would be expected to become discouraged and hang-up after a short time period, it is not the only measure available.

One other simple measure of call loading may be based upon the number of calls directed to the call type per time period. Using well known Erlang calculation techniques and an average time per call, this can be converted into a required number of full time agents.

A specific embodiment of a method and apparatus for an improved skill-based call routing system according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

Appendix I

Automatic Generation of Agent Occupancy Matrix: Requirements and Algorithm Descriptions by Mei Wang

Section 1: Introduction

The target occupancy matrix is defined as:

$X(i,j)$ = target occupancy of agent $i$ for work type $j$.

$\sum_j X(i,j) = Tocc(i)$, $Tocc(i)$ is the target total occupancy for agent $i$ Agent $i$ is expected to spend $X(i,j)$ of all his/her time on work type $j$. The algorithm described in this document automatically assigns values to $X(i,j)$. This algorithm first initializes the agents' occupancies while guarantee that all hard constraints are satisfied. Then this algorithm iteratively repairs upon the current solution using an objective function that maximizes the match between the assigned staffing for each work type and the workload, as well as maximizes the skill levels of agents on their assigned work types. This algorithms is O(nm), where n is the number of agents, m is the number of work types.

Section 2: Input

The input to the matrix generation algorithm includes are:
1. *NumOfAgents, numOfWorktypes, numOfSkills*
2. For each agent $i$:
   - *ASkl(i,k), (1≤ k ≤ numOfSkills, 1≤ ASkl(i,k) ≤ 10)*, agent $i$'s skill level for skill $k$;
   - *Tocc(i)*, this agent's target total occupancies *(0 ≤ Tocc(i) ≤ 1)*,
   - *AllowedWTs(i)*: a list of work types agent $i$ is allowed to work on. This must be a subset of all the work types agent $i$ is capable of working on. Defaults to all work types agent $i$ is capable of working on. (Note: in the current implantation, we have selected work types, meaning all the work types the agent must work on. In the C++ implementation, this will be changed).
   - (Optional), *UserPrimaryResWt(i)*, work type id where agent $i$ is assigned primary responsibility by the user.
   - (Optional), *x(i,j)*, agent $i$'s occupancy for work type $j$,
3. For each work type $j$:
   - *WSkl(j,k), (1≤ k ≤ numOfSkills, 1≤ WSkl(i,k) ≤ 10)*, minimal required skill level for skill $k$,
   - *StfPr(j)*, staffing priority for work type $j$
   - *PrdtWorkload(j)*, predicted workload for work type $j$
4. *UsePrimaryRes*: whether or not to assign primary responsibilities to agents
   *UsePrimaryRes = True*: assign primary responsibilities,
   *UsePrimaryRes = False*: do not assign primary responsibilities.
5. *PrimaryResValue, (0 ≤ PrimaryResValue ≤ 1)*: the value of the occupancy for an agent with primary responsibility for a work type (note: right now, there is one number for all agents; if needed, we can change this so that each agent may have different values). *PrimaryResValue* defaults to *70%*.
6. Advanced inputs (inputs user should typically not change):
   6.1. *NumOfCycles*: number of times to run the algorithm to generate the matrix. Default: *NumOfCycles = 1*.
   6.2. *MinNumWTPerAgent* and *MaxNumWTPerAgent*: minimal and maximal number of work types each agent can be assigned non-zero occupancy for.
   6.3. *WeightFTE*: a number indicating how important is to allocate the right amount of staffing to each work type to match the predicted workload. Default: *WeightFTE = 1*.
   6.4. *WeightSkills*: a number indicating how important it is to maximize the average of averageCapability per work type (the average capability of all agents working on each work type, weighted by agents' occupancies for that work type). Default: *WeightSkills = 10*.
   6.5. *MinOcc* and *MaxOcc*: minimal and maximal occupancy value. Defaults: *MinOcc = 0.05, MaxOcc = 1*.
   6.6. *MinOccToMove*: minimal occupancy value to move from one work type to another, used during matrix generation. Default: *MinOccToMove = 0.05*.

Section 3: Requirements

The algorithm must satisfy the following requirements:
1. Small changes in inputs should not result in dramatic changes in output. Smalls changes here means:
   1.1. Changes in one or a few agents' parameters:
      - User specified primary responsibility work type changes from one to another
      - Skill levels for a set of skills
      - Target total occupancy
      - Allowed work types
   1.2. Changes in one or a few work types' parameters:
      - Minimal required skill levels for a set of skills
      - Predicted workload
      - Staffing priority
2. The user may over specify constraints, in which case no solutions can be found. We should warn user of their conflicting inputs.
3. Must be fast enough for 500 agents x 50 work types.

Section 4: Algorithm for initial generation of occupancy matrix

The following notations are used in addition to the inputs stated above:

- *ACap(i,j)*: agent *i*'s capability for work type *j*.
- *BestCap(j)*: the largest capability for work type *j* of all agents
- *numOfAssignedWTs(i)*: the total number of work types agent i has non-zero occupancy.
- *AveCap(j)*: the average capability for work type *j* of all agents' capabilities for work type *j*, weighted by the agents's occupancies for work type *j*
- *TargetFTE(j)*: the target full time equivalent staffing for work type *j*.
- *AssignedFTE(j)*: the assigned full time equivalent staffing for work type *j*. It is the sum of all agents' occupancies for work type *j*.

Main():

1. Read in required user inputs (including agent skills, work type skills, user preferences, and partial occupancy matrix). Check input consistencies (for example, an agent must meet the minimum requirements for the work type that he is assigned primary responsibility for by the user).
2. Clamp the occupancy values set the user (clamped the values will not be changed by the algorithm).
   For *i = 1* to *numOfAgents*
      For *j = 1* to *numOfWorkTypes*
         If *X(i,j)* is set by the user then *X(i,j).userClamped = True*
         If *PrimaryResWt(i) =* j then *X(i,j) = primaryResValue, X(i,j).userClamped = True*
3. ComputeTargetFTE()
4. ComputeAgentCapabilities()
5. *BestScore = 0* (a global variable recording the best result so far);
   ReturnMatrix ← ();
6. For *i = 1* to *numOfCycles*:
   6.1. *NewMatrix* ← generateMatrix()
   6.2. If *NewMatrix.score > bestScore* then *BestScore = NewMatrix.score;*
                              *ReturnMatrix ← NewMatrix*
7. Return *ReturnMatrix*

ComputeTargetFTE()

1. Compute relative priorities of work types. Staffing priorities are 1-10, with 1 being the highest. Each priority is associated with a relative Priority (ranges between 1 and 2, with increments of 0.1). Thus, work type priority 1, the highest, corresponds to relative Priority 2, work type priority 2 corresponds to relative Priority 1.9 and so on, work type priority 10 corresponds to relativePriority 1.1.
2. Compute number of effective agents:

$$effectiveAgents = \sum_{i=1}^{numOfAgents} Tocc(i)$$

3. Compute residual staffing:

$$residualStaffing = effectiveAgents - \sum_{j=1}^{numOfWorkTypes} Pr\,dtworkload(j)$$

4. If there are more effective agents than sum of predicted workloads, distribute redisualStaffing to all work types based on their workloads and staffing priorities.
5. If there are fewer effective agents than sum of predicted workloads, each work type must be assigned fewer agents than required by its workload. The amount of agents fewer is dependent on the workloads and priorities.

$$perPortion = \frac{residualStaffing}{\sum_{j=1}^{numOfWorkTypes} relative\,Priority(j) * prdtworkload(j)}$$

$$target FTE(j) = perPortion * relative\,Priority(j) * prdtworkload(j) + prdtworkload(j)$$

ComputeAgentCapabilities():

For $i$ = 1 to *numOfAgents*,
   For $j$ = 1 to *numOfWorkTypes*

(a) If $\forall k$, *ASkl(i,k)* ≥ *WSkl(j,k)*, where $1 \le k \le$ *numOfSkills*, (i.e., agent $i$ satisfies minimal skill requirements of work type $j$, thus capable for work type $j$), then:

$$ACap(i,j) = \sqrt{\sum_{k}(ASkl(i,k) - WSkl(j,k))^2}, \quad (WSkl(j,k) > 0)$$

This is basically the euclidean distance between agent $i$'s skills and work type $j$'s required skill on skills required by the work type.

(b) If $\exists k$, s.t. *ASkl(i,k)* < *WSkl(j,k)*, where $1 \le k \le$ *numOfSkills*, (i.e., agent $i$ does not satisfies minimal skill requirements of work type $j$, thus not capable for work type $j$), then:

$$ACap(i,j) = -\sqrt{\sum_{k}(ASkl(i,k) - WSkl(j,k))^2}, \quad (WSkl(j,k) > ASkl(i,k))$$

This is basically the negative of the Euclidean distance between agent $i$'s skills and work type $j$'s minimal skill requirements on skills where the agent does not meet the minimal requirements.

(*ACap(i,j)* ≥ 0 means the agent $i$ has sufficient skills for work type $j$; *ACap(i,j)* < 0 means the agent does not have sufficient skills for work type $j$).

GenerateMatrix()

1. Initialize occupancies: For *i = 1* to *numOfAgents*
   1.1. If *usePrimaryRes = True* then initialize primary occupancies:

If *UserPrimaryResWt(i) = j* Then: *X(i, j) = primaryResValue*

Else: $X(i, j_0) = primaryResValue$ (random choose $j_0$, $j_0 \in allowedWTs(i)$)

1.2. Initialize rest occupancies such that:

a) $\sum_{j} X(i, j) = Tocc(i)$ b) *MinNumWTPerAgent* and *MaxNumWTPerAgent* constraints are satisfied.

c) *X(i, j) > 0* only if *ACap(i, j) ≥ 0*.

d) Maximize *numOfAssignedWTs(i)*.

1.3. Compute *assignedFTE(j), aveCap(j)*, $\forall j$, $1 \leq j \leq numOfWorkTypes$ 2. Assign occupancies by iterative repair:

For *m = 1* to *numOfIterations*:

*Score* ← computeObjectiveFunctionValue()

For *i = 1* to *numOfAgents*:

*FromWT* ← rndPickWT(*i*)

(randomly select a work type to move occupancy from for agent *i*)

*ToWT* ← rndPickWT(*i*) (randomly select a work type to move occupancy to for agent *i*)

*deltaOcc* ← genDeltaOcc (generate a occupancy value to move from work type *FromWT* to work type *ToWT*)

*deltaScore* ← computeDeltaScore

(compute the delta of the objective function when moving occupancy)

If **allowableMove(*i, FromWT, ToWT, deltaOcc*)**, then

If *deltaScore < 0*, or with probability 0.01 (value of this probability is changable):

then: move *deltaOcc* from work type *FromWT* to work type *ToWT*;

*Score* ← *Score + deltaScore*

Update *assignedFTE(FromWT), assignedFTE(ToWT), aveCap(FromWT), aveCap(ToWT)*

3. Fine tune occupancies: (Note: although this does result in lower objective function, it does not make a difference in performance on the simulator)

For *m = 1* to *numOfFineTuneIterations*:

*Score* ← computeObjectiveFunctionValue()

For *i = 1* to *numOfAgents*:

*FromWT* ← select an over-staffed work type where agent *i* has non-zero occupancy)

*ToWT* ← select an under-staffed work type where agent *i* has capability

*deltaOcc* ← *minOccToMove*

*deltaScore* ← computeDeltaScore

If **allowableMove(*i, FromWT, ToWT, deltaOcc*)** and *deltaScore < 0* then:

move occupancy *deltaOcc* from work type *FromWT* to work type *ToWT*;

*Score* ← *Score + deltaScore*

Update *assignedFTE(FromWT), assignedFTE(ToWT), aveCap(FromWT), aveCap(ToWT)* computeObjectiveFunctionValue():

value = weightFTE * scoreFTE + weightSkills * scoreSkills $$scoreFTE = \sum_{j=1}^{numOfWorkTypes}(targetFTE(j) - assignedFTE(j))^2$$

$$scoreSkills = \sum_{j=1}^{numOfWorkTypes}(aveCap(j) - bestCap(j))^2$$

allowableMove(i, FromWT, ToWT, deltaOcc)

If the following constraints remain satisfied after moving *deltaOcc* of occupancy from work type *FromWT* to work type *ToWT*, then return *True*; else return *False*.

(c1) If *usePrimaryRes* = *True* then agent *i* must be assigned primary responsibility for one work type.
(c2) *MinNumWTPerAgent* and *MaxNumWTPerAgent* constraints are satisfied.
(c3) $X(i, j) > 0$, only if $ACap(i, j) \geq 0$.
(c4) *numOfAssignedWTs(i)* does not decrease
  (Note: this constraint is enforced after we have learned from simulation results that the more sharing of agents, the better the performance in terms of service levels and ASA)

Section 5: Handling input changes at run time

1. For all agents: when input parameters for an agent has changed, change this agent's occupancies accordingly:
   1.1. When target total occupancy changes.
      1.1.1. If increased, add the increased portion to some work type (heuristic: the work type with highest predicted workload where this agent has occupancy.)
      1.1.2. If decreased, we go through the list of work types this agent has non-zero occupancy, decrease occupancy amount as much as possible but still keep it non-zero.
   1.2. When user specified primary responsibility work type changes: readjust this agent's occupancy for the old and new primary responsibility work type.
   1.3. When this agent's skill levels change:
      1.3.1. Recalculate this agent's capabilities. Do nothing if there are no changes in the capabilities.
      1.3.2. If the capabilities changed: for each work type j, if this agent had non-zero occupancy for this work type, but is now incapable of handling work type j, move all occupancy from j to another work type. (Heuristic: the work type with highest predicted workload where this agent has capability.)
   1.4. Changes in allowed work types. Do step 1.3.2 when this agent has non-zero occupancy for a work type that is no longer an allowed work type.
2. For all work types: when work type parameter change,
   1.1. If workload or staffing priorities change, recompute *targetFTE* for all work types
   1.2. If minimal skill requirements change for some work types, recompute agent capabilities for these work types. For a work type where an agent had non-zero occupancy but is now not capable of handling, move this agent's occupancy from this work type to another one.
3. Call generateMatrix: at any step in the computation, if the *score* in the resulting matrix is close enough to the previous score, stop and return the matrix.

Section 6: (Near) Future work

- Advise: when the *assignedFTE* for each work type is far below *targetFTE*, it is most likely because there are not enough agents with the correct skills. Inform supervisors of that.

Automatic Generation of Agent Responsibility Matrix
(A brief description)

The agent responsibility matrix specifies for each agent, the percentage of time the agent spends on each call type. This percentage number for agent $i$ and call type $j$ is called *occupancy*. The sum of an agent's occupancies for all call types is the *total occupancy* of the agent.

The input to the matrix generation algorithm includes are:

- Agent skills: the knowledge level of an agent in a given area
  ex: Bill is skilled at different levels in Voice, Email, Fax, H/W & S/W

| Agent Name | Voice | Email | Fax | Hardware | Software |
  |---|---|---|---|---|---|
  | Bill S 1111 | 9 | 4 | 4 | 0 | 2 |

- Agent total occupancy: for an agent, the % of available time of a workday that is his actual work time (50%, 85%, ...)

- Worktype skills: the knowledge level each worktype requires
  ex: worktype CustomService/Call/S/W requires skills in voice, and software

| Worktype Name | Voice | Email | Fax | Hardware | Software |
  |---|---|---|---|---|---|
  | CustomService, Call, S/W | 5 | | | | 6 |
  | CustomService, Email, H/W | | 5 | | 6 | |
  | Order, H/W Fax | | | 5 | 6 | |

(Skills Required)

- Workload for each work type.

An example of responsibility matrix generated automatically is as follows:

| Agent | Total Occ | Call,S/W | Email, H/W | Order, H/W,Fax |
|---|---|---|---|---|
| Bill S | 90% | 90% | | |
| Patrick U | 80% | | 40% | 40% |
| Randy C | 80% | | 50% | 30% |
| Susan G | 85% | 10% | 40% | 35% |

Algorithm:

The objective of generating responsibility matrix is to distribute agents to work on different work types so that each work type has appropriate number of assigned agents according to its workload. Traditional approach uses Erlang computation to determine staffing requirements; however, Erlang formula does not work well in skill-based routing with complicated agents sharing. The following algorithm is used to determine staffing requirements, instead of traditional Erlang computation. Our algorithm is as follows (this is a brief description, a great amount of detail is omitted here):

1. Initialize occupancies: for each agent, randomly assign occupancies for work types this agent has sufficient skills for, and in this process, ensure that the occupancies for each agent add up to his/her total occupancy.
2. Assign occupancies by *iterative repair:*
   For each agent, randomly move this agent's occupancy from one work type to another. If this move results in "better" staffing according to the workloads of all work types, then we update the existing matrix according to this random move; otherwise, we keep the matrix as it is, and repeat the process.

The invention claimed is:

1. A method of assigning agents of an automatic call distributor to incoming calls of a plurality of call types handled by the automatic call distributor, such method comprising the steps of:
   determining a target occupancy matrix including a target occupancy for each agent of the agents of the automatic call distributor for each call type of the plurality of call types and where the total occupancies among at least some of the agents are not equal;
   in an overstaffed situation, processing a call of a first type of the types determined in the target occupancy matrix; and
   assigning the processed call to an agent of the agents of the automatic call distributor with a largest relative difference between an actual occupancy of calls of the first type handled by the agent and the target occupancy of calls of the first type determined for the agent in the target occupancy matrix; and
   in an understaffed situation, when an agent of the agents becomes available, selecting a call from a queue of a work type of the plurality of work types having a largest relative difference between actual occupancy and target occupancy among the work types of the available agent; and
   assigning the selected call to the available agent.

2. The method of assigning agents as in claim 1 further comprising generating the target matrix from permanent, semi-permanent and variable data.

3. The method of assigning agents as in claim 2 wherein the step of generating the target matrix from the permanent data further comprises defining a plurality of work types where each work type characterizes at least some of the incoming call types.

4. The method of assigning agents as in claim 3 wherein the step of generating the target matrix from the permanent data further comprises providing a list of agent skill types required for each work type of the incoming call types.

5. The method of assigning agents as in claim 4 wherein the step of generating the target matrix from the permanent data further comprises providing a minimum agent skill level required by each work type of the incoming call types.

6. The method of assigning agents as in claim 5 wherein the step of generating the target matrix from the semi-permanent data further comprises providing a skill level of each agent with respect to each skill type required by each work type of the incoming call types.

7. The method of assigning agents as in claim 6 wherein the variable data further comprises manually providing a target occupancy level for at least some agents of the target matrix.

8. The method of assigning agents as in claim 2 wherein the step of generating the target matrix further comprising randomly assigning work type occupancies to each agent of the plurality of agents within the target matrix.

9. The method of assigning agents as in claim 8 wherein the step of randomly assigning work type occupancies to each agent of the plurality of agents within the target matrix further comprises iterativly repairing the target matrix.

10. The method of assigning agents as in claim 9 wherein the step of iterativly repairing the target matrix further comprises sequentially selecting an agent and randomly selecting a work type.

11. The method of assigning agents as in claim 10 wherein the step of sequentially selecting an agent and randomly selecting a work type further comprises assigning a fractional occupancy of the agent to the randomly selected work type, thereby generating a new target matrix.

12. The method of assigning agents as in claim 11 wherein the step of sequentially selecting an agent and randomly selecting a work type further comprises calculating a change in an objective function of the new target matrix.

13. The method of assigning agents as in claim 12 wherein the step of calculating a change in an objective function of the new target matrix further comprises adopting the new target matrix as the repaired matrix when the calculated change is less than zero.

14. Apparatus for assigning agents of an automatic call distributor to incoming calls of a plurality of call types handled by the automatic call distributor, such apparatus comprising:
    means for determining a target occupancy matrix including a target occupancy for each agent of the agents of the automatic call distributor for each call type of the plurality of call types and where total occupancies among at least some of the agents are not equal;
    means in the overstaffed situation for processing a call of a first type of the types determined in the target occupancy matrix; and
    means for assigning the processed call to an agent of the agents of the automatic call distributor with a largest relative difference between an actual occupancy of calls of the first type handled by the agent and the target occupancy of calls of the first type determined for the agent in the target occupancy matrix;
    means in an understaffed situation, when an agent of the agents becomes available, for selecting a call from a queue of a work type of the plurality of work types having a largest relative difference between actual occupancy and target occupancy among the work types of the available agent; and
    means for assigning the selected call to the available agent.

15. The apparatus for assigning agents as in claim 14 further comprising means for generating the target matrix from a plurality of permanent, semi-permanent and variable data.

16. The apparatus for assigning agents as in claim 15 wherein the means for generating the target matrix from the permanent data further comprises means for defining a plurality of work types where each work type characterizes at least some of the incoming call types.

17. The apparatus for assigning agents as in claim 16 wherein the means for generating further comprises means for providing a list of agent skill types required for each work type of the incoming call types.

18. The apparatus for assigning agents as in claim 17 wherein the means for generating further comprises means for providing a minimum agent skill level required by each work type of the incoming call types.

19. The apparatus for assigning agents as in claim 18 wherein the means for generating further comprises means for providing a skill level of each agent with respect to each skill type required by each work type of the incoming call types.

20. The apparatus for assigning agents as in claim 19 wherein the means for generating further comprises means for manually providing a target occupancy level for at least some agents of the target matrix.

21. The apparatus for assigning agents as in claim 15 wherein the means for generating the target matrix further comprising means for randomly assigning work type occupancies to each agent of the plurality of agents within the target matrix.

22. The apparatus for assigning agents as in claim 21 wherein the means for randomly assigning work type occupancies to each agent of the plurality of agents within the target matrix further comprises means for iterativly repairing the target matrix.

23. The apparatus for assigning agents as in claim 22 wherein the means for iterativly repairing the target matrix further comprises means for sequentially selecting an agent and randomly selecting a work type.

24. The apparatus for assigning agents as in claim 23 wherein the means for sequentially selecting an agent and randomly selecting a work type further comprises means for assigning a fractional occupancy of the agent to the randomly selected work type, thereby generating a new target matrix.

25. The apparatus for assigning agents as in claim 24 wherein the means for sequentially selecting an agent and randomly selecting a work type further comprises means for calculating a change in an objective function of the new target matrix.

26. The apparatus for assigning agents as in claim 25 wherein the means for calculating a change in an objective function of the new target matrix further comprises means for adopting the new target matrix as the repaired matrix when the calculated change is less than zero.

27. Apparatus for assigning agents of an automatic call distributor to incoming calls of a plurality of call types handled by the automatic call distributor, such apparatus comprising:
a matrix processor adapted to determine a target occupancy matrix including a target occupancy for each agent of the agents of the automatic call distributor for each call type of the plurality of call types and where total occupancies among at some of the agents are not equal;
a call processor adapted to process a call of a first type of the types determined in the target occupancy matrix; and
a call distributor adapted to assign the call in an overstaffed situation to an agent of the agents of the automatic call distributor with a largest relative difference between an actual occupancy of calls of the first type handled by the agent and the target occupancy of calls of the first type determined for the agent in the target occupancy matrix;
the call distributor, in an understaffed situation when an agent of the agents becomes available, being further adapted to select and assign a call to the available agent from a queue of a work type of the plurality of work types having a largest relative difference between actual occupancy and target occupancy among the work types of the available agent.

28. The apparatus for assigning agents as in claim 27 further comprising a plurality of permanent, semi-permanent and variable data.

29. The apparatus for assigning agents as in claim 28 wherein the permanent data further comprises a plurality of work types where each work type characterizes at least some of the incoming call types.

30. The apparatus for assigning agents as in claim 29 wherein the matrix processor further comprises a list of agent skill types required for each work type of the incoming call types.

31. The apparatus for assigning agents as in claim 30 wherein the matrix processor further comprises a minimum agent skill level required by each work type of the incoming call types.

32. The apparatus for assigning agents as in claim 31 wherein the matrix processor further comprises a skill level of each agent with respect to each skill type required by each work type of the incoming call types.

33. The apparatus for assigning agents as in claim 27 wherein the matrix processor further comprises a manually entered target occupancy level for at least some agents of the target matrix.

34. The method of assigning agents as in claim 33 wherein the matrix processor further comprising a selection processor adapted to randomly assign work type occupancies to each agent of the plurality of agents within the target matrix.

35. The apparatus for assigning agents as in claim 34 wherein the selection processor further comprises a repair processor adapted to iterativly repair the target matrix.

36. The apparatus for assigning agents as in claim 35 wherein the repair processor further comprises an objective function processor adapted to calculate a change in an objective function of the new target matrix.

37. The apparatus for assigning agents as in claim 36 wherein the objective function processor further comprises a update processor adapted to adopt the new target matrix as the repaired matrix when the calculated change is less than zero.

38. A method of assigning a plurality of agents to incoming calls by an automatic call distributor, such method comprising the steps of:
determining a target matrix specifying a mix and proportion of call types to be handled by each agent of the plurality of agents and where a total occupancy of call types handled among at least some of the agents are not equal;
in the overstaffed situation, receiving and assigning calls based upon the mix and proportion of call types specified in the target matrix with agent selection based upon an actual occupancy of the target matrix by the agent and a largest relative difference between the actual occupancy and the target matrix;
in an understaffed situation, when an agent of the agents becomes available, selecting and assigning a call to the available agent from a queue of a work type of the plurality of work types having a largest relative difference between actual occupancy and target occupancy among the work types of the available agent.

* * * * *